(12) United States Patent
Akagi et al.

(10) Patent No.: US 6,827,064 B2
(45) Date of Patent: Dec. 7, 2004

(54) ENGINE FUEL INJECTION APPARATUS

(75) Inventors: Takashi Akagi, Saitama (JP);
Yoshiyuki Kurayoshi, Saitama (JP);
Tomomi Yuhara, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/649,826

(22) Filed: Aug. 28, 2003

(65) Prior Publication Data
US 2004/0079337 A1 Apr. 29, 2004

(30) Foreign Application Priority Data

Sep. 11, 2002 (JP) ........................................ 2002-266143

(51) Int. Cl.[7] ............................ F02B 41/06; F02B 11/00
(52) U.S. Cl. ..................... 123/431; 123/456; 123/468
(58) Field of Search ............................ 123/431, 179.14, 123/179.15, 456, 468

(56) References Cited

U.S. PATENT DOCUMENTS

| 5,251,582 | A | * | 10/1993 | Mochizuki | ................ | 123/73 A |
| 5,608,632 | A | | 3/1997 | White | | |
| 5,924,405 | A | * | 7/1999 | Hashimoto | ................... | 123/431 |
| 6,637,406 | B2 | * | 10/2003 | Yamada et al. | ............. | 123/431 |
| 2004/0007209 | A1 | * | 1/2004 | Ohtani | ........................ | 123/431 |

FOREIGN PATENT DOCUMENTS

| EP | 2000-097131 A | 4/2000 |
| EP | 2001-115919 A | 4/2001 |
| EP | 2002-317738 A | 10/2002 |
| JP | 2000-097132 A | 4/2000 |

* cited by examiner

*Primary Examiner*—Thomas Moulis
(74) *Attorney, Agent, or Firm*—Birch, Stewart, Kolasch & Birch, LLP

(57) ABSTRACT

To enable a reduction of the number of fuel pipes and joint parts to facilitate piping work, maintenance and inspection. An engine fuel injection apparatus includes first fuel injection valves provided on an upstream side of an air intake passage of an engine, second fuel injection valves provided on a downstream side of the air intake passage, and a fuel pump for supplying fuel to the first and the second fuel injection valves. The second fuel injection valves are positioned at a level lower than the first fuel injection valves, and the fuel pump is connected to the second fuel injection valves via the first fuel injection valves by fuel feed pipes, so that fuel does not return to a fuel tank of the engine.

18 Claims, 12 Drawing Sheets

ENGINE FUEL INJECTION APPARATUS

CROSS-REFERENCES TO RELATED APPLICATIONS

This nonprovisional application claims priority under 35 U.S.C. § 119(a) on Patent Application No. 2002-266143 filed in Japan on Sep. 11, 2002, the entirety of which is herein incorporated by reference.

BACKGROUND OF THE INVENTION

1. Field of the Invention

The present invention relates to an engine fuel injection apparatus. More more particularly, the present invention relates to an improved engine fuel injection apparatus.

2. Description of Background Art

Japanese Patent Document No. JP-A-2000–97132 (P.3–4, FIGS. 1–3) describes and shows a motorcycle having an engine fuel injection apparatus of the background art. This type of engine fuel injection apparatus includes a first fuel injection valve provided on an upstream side of an engine throttle valve, and a second fuel injection valve provided on a downstream side of the throttle valve. In addition, fuel is supplied to the first and the second fuel injection valves by a fuel pump.

However, the present inventors have determined that the apparatus of the background art suffers from the following disadvantages. For example, a fuel feed pipe from the fuel pump is branched and connected to the first fuel injection valve and the second fuel injection valve, respectively, and excess fuel is returned to a fuel tank from the first and the second fuel injection valves via a return pipe. Therefore, an increased number of pipes in the fuel piping and coupling parts is required with this apparatus of the background art. Furthermore, assembly is more time consuming and is limited in the order in which the respective parts may be installed or connected. Therefore, piping work, maintenance, and inspection are cumbersome in the apparatus of the background art.

SUMMARY OF THE INVENTION

The present invention overcomes the shortcomings associated with the background art and achieves other advantages not realized by the background art. An object of the present invention is to provide an improved fuel injection apparatus that can reduce the required number of pipes and coupling parts in the fuel system.

An additional object of the present invention is to provide an improved fuel injection apparatus that facilitates piping work, maintenance, and inspection.

In order to achieve the object, a first aspect of the present invention is directed to an engine fuel injection apparatus including a first fuel injection valve provided on an upstream side of an air intake passage of an engine, a second fuel injection valve provided on a downstream side of the air intake passage, and a fuel pump for supplying fuel to the first and the second fuel injection valves, wherein the fuel pump is connected to the second fuel injection valve via the first fuel injection valve or to the first fuel injection valve via the second fuel injection valve by a fuel feed pipe, so that fuel does not return to a fuel tank.

The fuel pump is connected to the second fuel injection valve via the first fuel injection valve or to the first fuel injection valve via the second fuel injection valve by the fuel feed pipe, so that fuel does not return to the fuel tank. Accordingly, a return pipe is not necessary and thus the number of fuel feed pipes may be reduced correspondingly. The number of joints (joint parts) of the fuel feed pipes may also be reduced. Therefore, fuel piping can be simplified. In addition, since maintenance and inspection are facilitated, the workability is improved.

According to a second aspect of the present invention, the fuel pump is connected to the second fuel injection valve via the first fuel injection valve by the fuel feed pipe, the first fuel injection valve is a fuel injection valve for high-speed operation that injects fuel when the number of revolutions of the engine is high, and the second fuel injection valve is a fuel injection valve for low-speed operation that injects fuel when the number of revolutions of the engine is low.

While the engine is in operation, fuel is constantly injected from the second fuel injection valve for low-speed operation. Therefore, even when a small quantity of air is mixed in the fuel in the fuel piping, it is injected in an early stage and constantly from the second fuel injection valve. Therefore, the quantity of air trapped in the first fuel injection valve for high-speed operation is negligible, and thus the engine can maintain a stable performance.

According to a third aspect of the present invention, the fuel pump is connected to the first fuel injection valve via the second fuel injection valve and the first fuel injection valve is disposed at a level higher than the second fuel injection valve by the fuel feed pipe.

Fuel is supplied to the second fuel injection valve, which is located at a lower level on ahead. When the engine is in operation, fuel is constantly injected from the second fuel injection valve, which is located at the lower level. Therefore, even when a small quantity of air is mixed in the fuel in the fuel piping, it is injected in an earlier stage and constantly from the second fuel injection valve. Consequently, the quantity of air trapped in the first fuel injection valve located at a higher level is negligible, and thus the engine can maintain its performance in a more stable manner.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
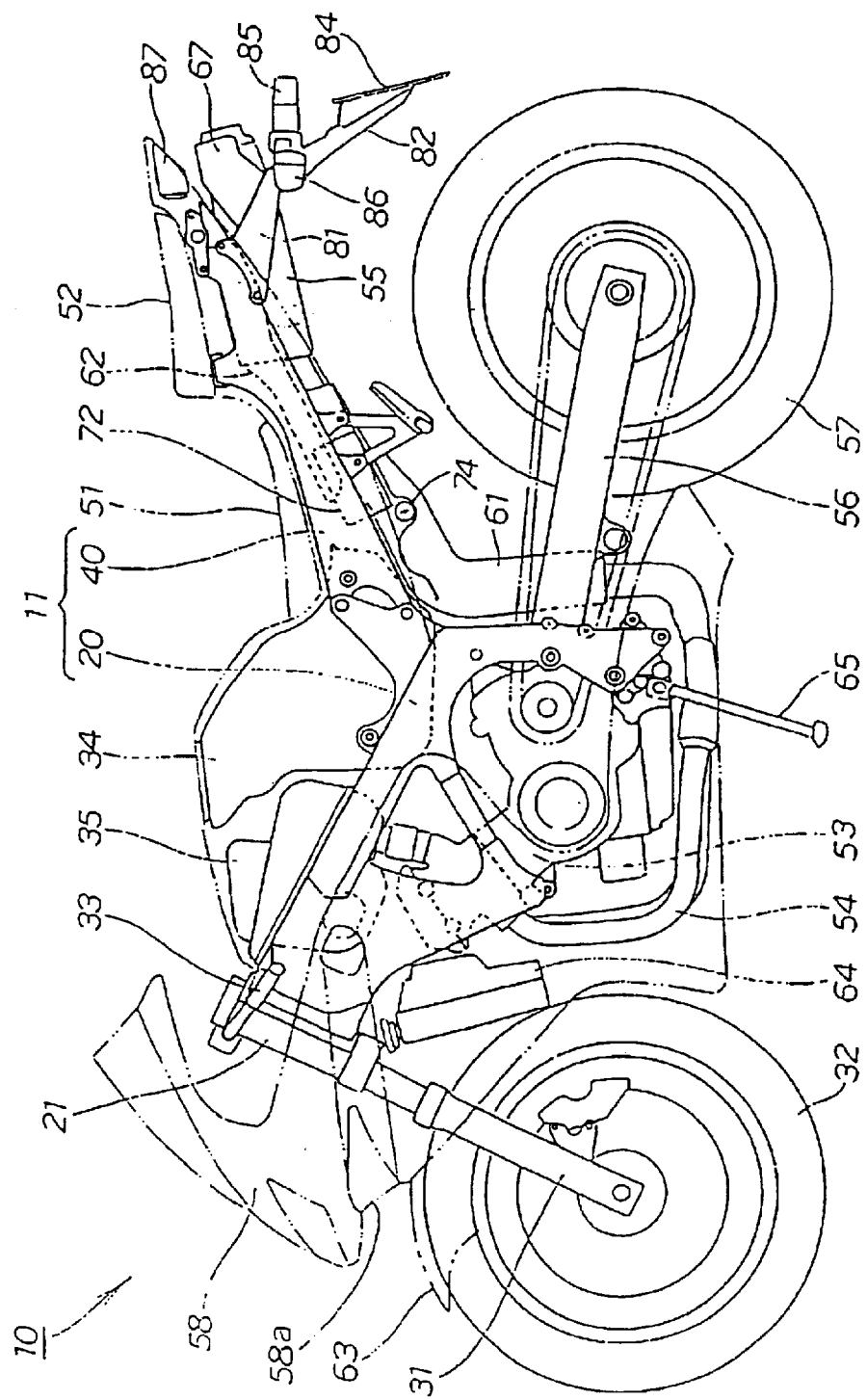
FIG. 1 is a left side view of a motorcycle according to the present invention.

Referring to attached drawings, an embodiment of the present invention will be described below. The terms "front", "rear", "left", "right", "up" and "down" refer to directions as viewed from the perspective of a driver. The drawings should be viewed so that the reference numerals are oriented in an upright position.

FIG. 1 is a left side view of a motorcycle according to the present invention. A motorcycle 10 includes a cradle type vehicle body frame 20. A front fork 31 is mounted to a head pipe 21 of the vehicle body frame 20. A front wheel 32 is attached to the front fork 31. A handle or handle bar 33 is connected to the front fork 31. A fuel tank 34 and an air chamber 35 are mounted on the vehicle body frame 20. A seat rail 40 extends rearward from the vehicle body frame 20. A front seat 51 and a rear seat 52 are mounted on the seat rail 40. A four-cycle engine 53 is disposed in a cradle space of the vehicle body frame 20. A muffler 55 is connected to an exhaust port of the engine 53 via an exhaust pipe 54. A swing arm 56 is suspended by a rear cushion or shock absorber (not shown) from the rear portion of the vehicle body frame 20. A rear wheel 57 is attached to the swing arm 56. The motorcycle 10 is a vehicle in which a vehicle body 11 is covered with a cowl 58, as indicated by imaginary lines, i.e., a motorcycle having a full cowling.

The vehicle body 11 includes the vehicle body frame 20 and the seat rail 40. The seat rail 40 is a rear frame supporting the seats (front and rear seats 51, 52). A driver can sit on the front seat 51 and a fellow passenger can sit on the rear seat 52.

The exhaust pipe 54 is a metal pipe starting from the exhaust port provided on the front portion of the engine 53, passing under the engine 53, and extending rearward of the vehicle body frame 20. The exhaust pipe 54 then extends from the rear end thereof upward along the vehicle body frame 20, and then from the upper end thereof, extends along the seat rail 40 to the muffler 55. Reference numeral 61 represents a heat-shielding pipe for covering the exhaust pipe 54. Reference numeral 62 represents a heat shielding plate for covering the upper portion of the muffler 55. Reference numeral 67 represents a protector for covering the left and the right rear portions of the muffler 55. The protector 67 is a protecting plate mounted to a stay 81 for mounting a rear fender 82.

As described above, in the motorcycle 10, the front wheel 32, the engine 53, and the rear wheel 57 are mounted from the front to the rear in this order on the vehicle body 11. The exhaust pipe 54 extends rearward from the engine 53. The muffler 55 is attached at the rear end of the exhaust pipe 54.

The muffler 55 is disposed on the rear portion of the vehicle body frame 20 between the left and the right seat rails of the seat rail 40 above the rear wheel 57.

In FIG. 1, reference numeral 63 identifies a front fender. Reference numeral 64 identifies a radiator. Reference numeral 65 identifies a stand. Reference numeral 72 identifies a battery. Reference numeral 74 identifies a key cylinder. Reference the numeral 82 identifies a rear fender. Reference numeral 84 identifies a number plate. Reference numeral 85 identifies a license plate lamp. Reference numeral 86 identifies a winker or blinker. Furthermore, reference numeral 87 identifies a tail lamp.

Figure 2:
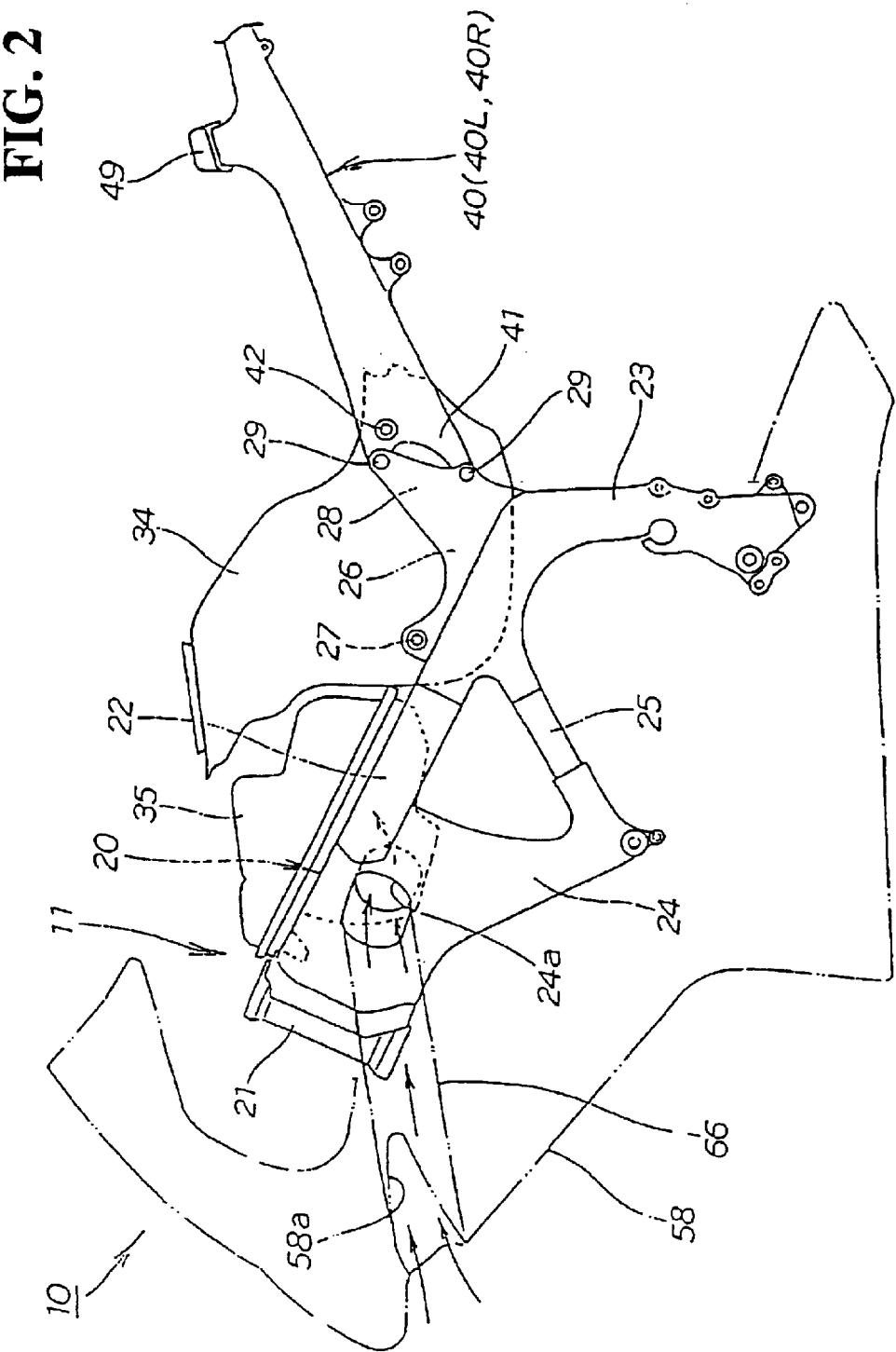
FIG. 2 is a left side view of a vehicle body according to the present invention.
Figure 3:
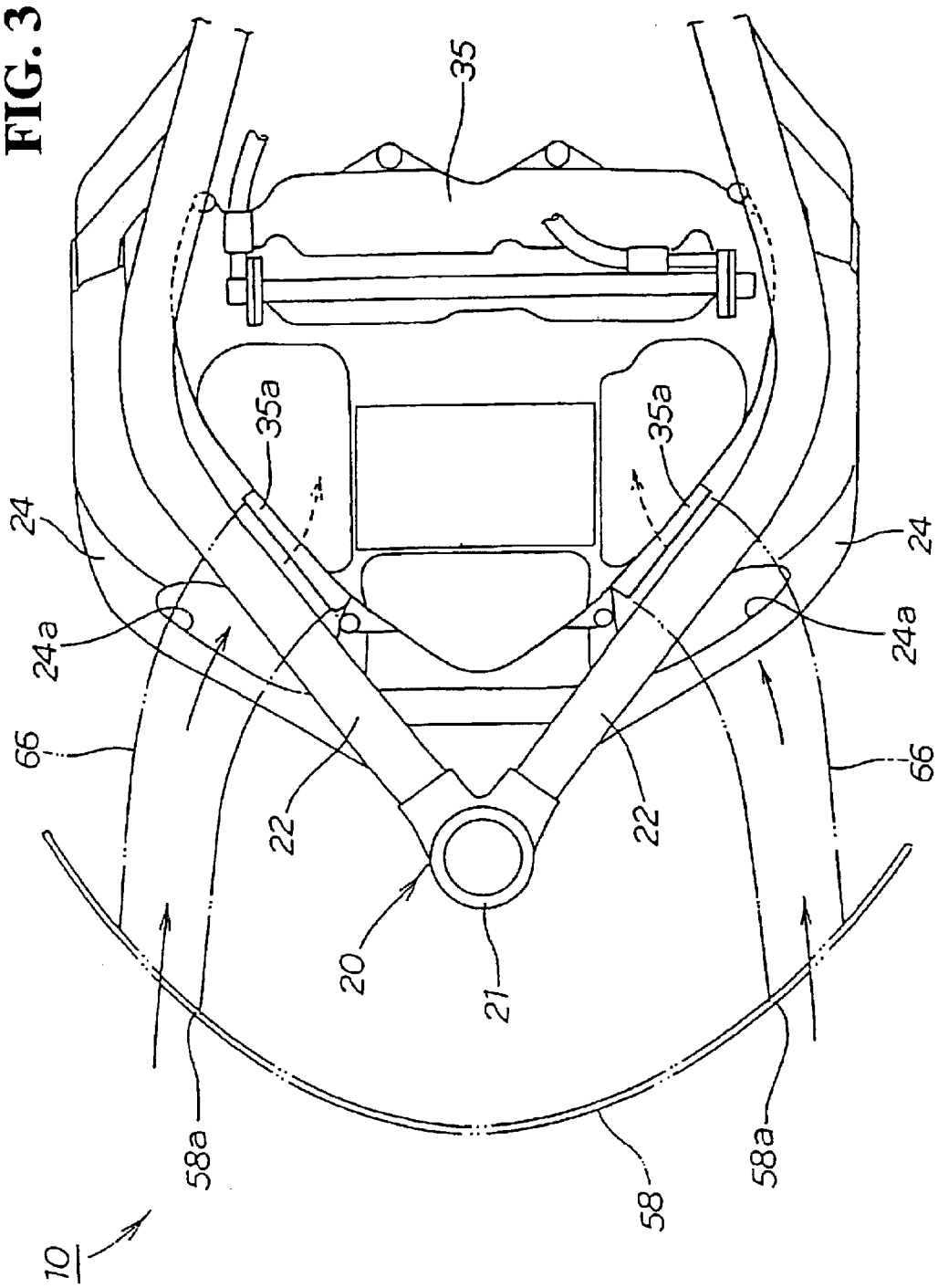
FIG. 3 is a plan view of the vehicle body according to the present invention.

FIG. 2 is a left side view of a vehicle body according to the present invention. FIG. 3 is a plan view of a vehicle body according to the present invention. In FIGS. 2 and 3, the vehicle body frame 20 includes the head pipe 21. Left and right main frames 22, 22 extend rearward from the head pipe 21. Left and right center frames 23, 23 extend downward from the rear ends of the main frames 22, 22 (only the left center frame is shown in the figure, hereinafter). Left and right down frames 24, 24 extend from the head pipe 21 and the front portions of the main frames 22, 22 downward toward the rear. Left and right upper frames 25, 25 extend from the lower ends of the down frames 24, 24 toward the rear portions of the main frames 22, 22. A plurality of cross members is also provided, but is not shown in the drawing. In addition, part or all of the frame components are formed by metal casting.

The down frames 24, 24 include left and right through holes 24a, 24a at the front portions thereof so as to communicate the inside and the outside. Air intake pipes 66, 66 shown by imaginary lines can be inserted through the through holes 24a, 24a. The air intake pipes 66, 66 connect air vents 58a, 58a formed on the front portion of the cowl 58 and the air intake ports 35a, 35a of the air chamber 35. Alternatively, the through holes 24a, 24a may be utilized as parts of the air intake pipes 66, 66.

The vehicle body frame 20 includes left and right brackets 26, 26 extending upward from the upper rear portions of the left and the right main frames 22, 22. The left and the right brackets 26, 26 support members including fuel tank supporting portions 27, 27 on the front portions thereof and seat rail mounting portions 28, 28 on the rear portions thereof. By mounting the seat rail 40 to seat rail mounting portions 28, 28 via bolts 29, the seat rail 40 can be extended rearward from the upper rear portion of the vehicle body frame 20. The fuel tank supporting portions 27, 27 are through holes pierced widthwise of the vehicle.

Figure 4:
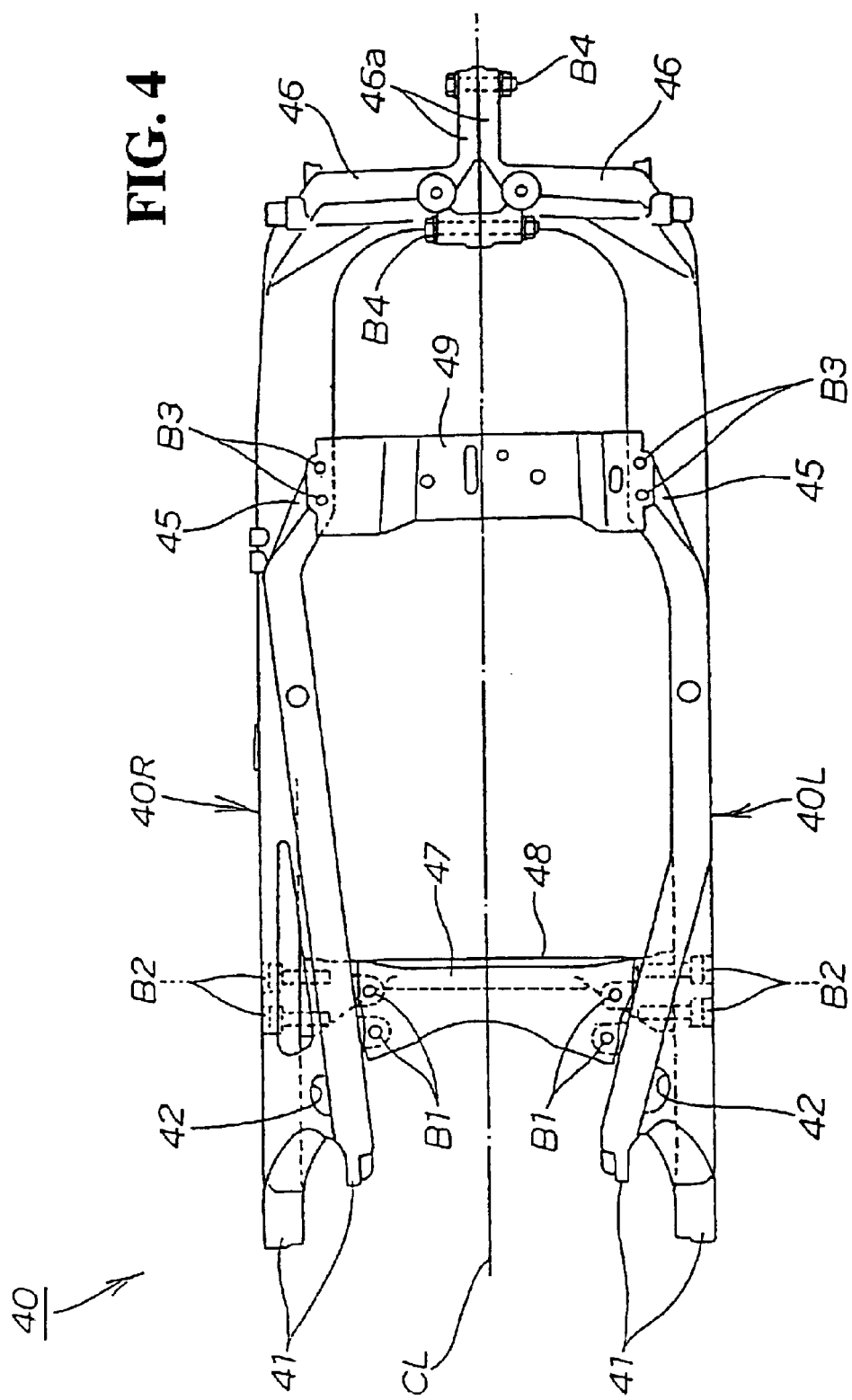
FIG. 4 is a plan view of a seat rail according to the present invention.
Figure 5:
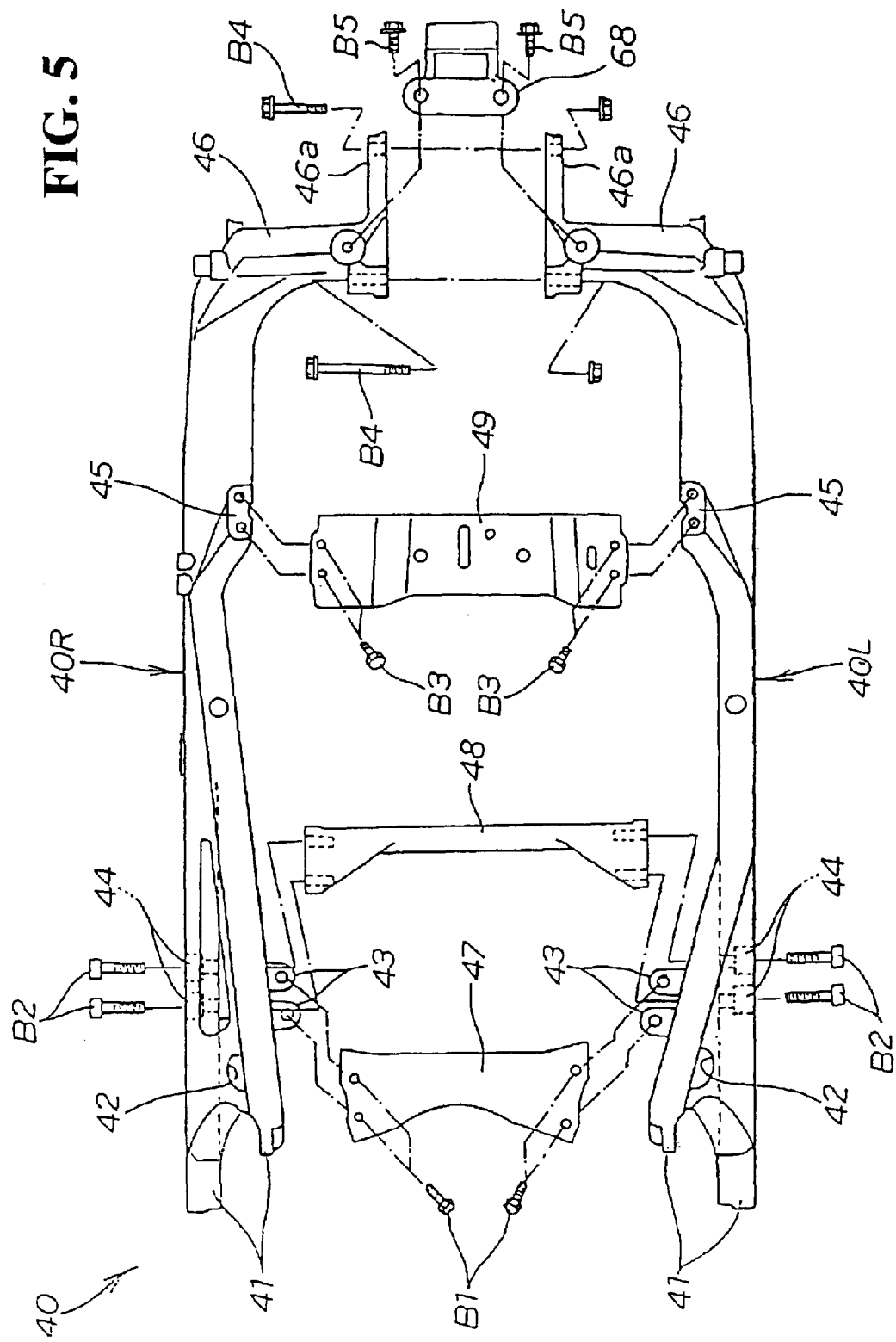
FIG. 5 is an exploded view of the seat rail according to the present invention.

FIG. 4 is a plan view of the seat rail according to the present invention. FIG. 5 is an exploded drawing of the seat rail according to the present invention.

The seat rail 40 includes a left seat rail 40L and a right seat rail 40R divided along the centerline CL of the vehicle extending in the longitudinal direction. Three cross members, i.e., a upper front cross member 47, a lower front cross member 48, and a rear cross member 49, are disposed in this order from the front to the rear across the left and the right seat rails 40L, 40R.

The left and the right seat rails 40L, 40R are constructed of left and right halves each having substantially flat upper and lower surfaces, and are formed by casting. In other words, the left and the right seat rails 40L, 40R include surfaces extending laterally of the vehicle (upper and lower surfaces), which are substantially flat for enabling fabrication with a split mold, and which can be divided laterally of the vehicle, when being molded.

The left and right seat rails 40L, 40R include rail mounting portions 41 at the front end (left side of the drawing). Fuel tank supporting portions 42, 42 are formed behind the rail mounting portions 41. Upper front coupling parts 43, 43 and lower front coupling parts 44, 44 are formed behind the fuel tank supporting portions 42, 42. Rear coupling parts 45, 45 are formed behind the lower front coupling potions 44, 44. Extensions 46, 46 extend from the rear ends (right side of the drawing) toward the centerline CL and extend longitudinally of the vehicle. Furthermore, flanges 46a, 46a are provided for mating the extremities thereof with respect to each other. All of the elements of the left and right seat rails 40L, 40R are formed integrally with each other. In addition, the fuel tank supporting portions 42, 42 are through holes formed so as to pierce widthwise of the vehicle.

The left and the right seat rails 40L, 40R are combined with each other by the steps of (1) superimposing the upper front cross member 47 on the upper front coupling parts 43,43 from above so as to extend across therebetween and securing by securing members B1 such as bolts; (2) sandwiching the ends of the lower front cross member 48 between the lower front coupling parts 44, 44 and securing with securing members B2 such as bolts; (3) superimposing the rear cross member 49 on the rear coupling parts 45, 45 from above and securing by securing members B3 such as bolts; and (4) mating the flanges 46a, 46a with respect to each other and securing them with securing members B4 such as bolts.

In this manner, the seat rails 40 are cast having a substantially flat upper surface, including at least one cross member 47–49. The cross member 47–49 can be mounted by a securing member B1–B4 such as bolts after assembly.

As shown in FIG. 5, a hook plate 68 (seat mounting member 68) formed of a plate material may be mounted to the extensions 46, 46 by securing members B5, B5 such as bolts after assembly. The hook plate 68 is a member for mounting the rear portion of the rear seat 52 (See FIG. 1).

Figure 6:
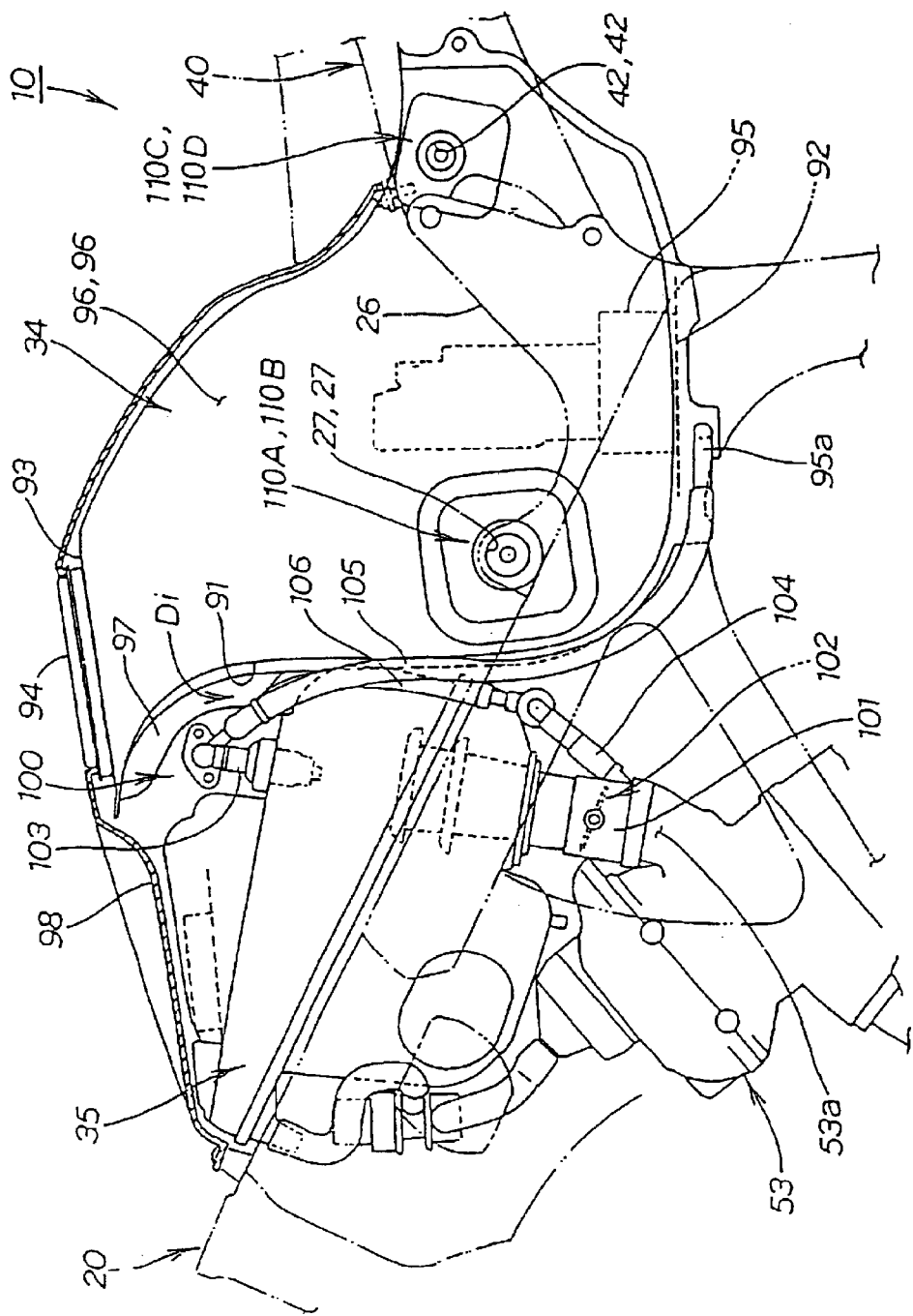
FIG. 6 is a left side view showing the area around an engine, a fuel tank, and an air chamber.

FIG. 6 is a left side view of an area around the engine, the fuel tank, and the air chamber according to the present invention, showing that the air chamber 35 is disposed immediately above the engine 53. The fuel tank 34 is disposed immediately behind and adjacent to the air chamber 35 with a gap Di being formed therebetween.

The fuel tank 34 includes a front wall 91 and a bottom plate 92, which is substantially flat. A fuel port 94 is formed on an upper plate 93. A fuel pump 95 is provided on the bottom thereof. Furthermore, mount portions are formed on left and right side plates 96, 96 (first, second, third, and fourth mount portions 110A–110D).

As is clear from this drawing, the upper surface of the fuel tank 34 is at a level slightly higher than the upper surface of the air chamber 35. By bending only the upper portion of the front wall 91 so as to be concave on the lower side, and extending the same slightly toward the front, only the upper rear portion of the air chamber 35 is covered by an extension 97. The upper half of the fuel tank 34 and the upper half of the air chamber 35, i.e., the portion projecting above the vehicle body frame 20 are covered by a cover 98. The cover 98 is detachably mounted to the vehicle body frame 20.

The engine 53 is a four-cylinder engine, and is provided with a fuel injection apparatus 100. This drawing shows that air intake passages 101 are connected to respective air inlet ports 53a (aligned in the direction of front and back sides of the drawing) for each cylinder. Throttle valves 102 are provided in the respective air intake passages 101. The air chamber 35 is provided on the upstream ends of the air intake passages 101.

The fuel injection apparatus 100 is constructed in such a manner that first fuel injection valves 103 are mounted to the air chamber 35 on the upstream side of the throttle valves 102 for the respective cylinders. Second fuel injection valves 104 are mounted to the air intake passages 101 on the downstream side of the throttle valves 102 for the respective cylinders. In this manner, the first fuel injection valves 103 are provided on the engine 53 on the upstream side of the air intake passages 101 and the second fuel injection valves 104 are provided on the downstream side of the air intake passages 101.

The first fuel injection valves 103 are disposed at a level higher than the second fuel injection valves 104, i.e., the second fuel injection valves 104 are disposed at a level lower than the first fuel injection valves 103.

Only the second fuel injection valves 104 are used when the engine 53 is in a lowpower operation. The first fuel injection valves 103 and the second fuel injection valves 104 are used in combination when in a high & low-power operation, so that the performance of the engine 53 is enhanced.

In other words, the second fuel injection valves 104 provided in the air intake passage 101 are referred to as fuel injection valves for low-speed operation of the engine 53, which inject fuel when the number of revolutions of the engine 53 is low.

The first fuel injection valves 103 provided in the air chamber 35 are referred to as fuel injection valves for high-speed operation of the engine 53, which inject fuel when the number of revolutions of the engine 53 is high.

When the revolutions of the engine 53 are low, fuel is supplied to the air intake passage 101 in the vicinity of the combustion chamber of the engine 53 from the second fuel injection valves 104. Thus, responsibility of the amount of fuel supplied is improved.

The fuel pump 95 includes a discharge port 95a at a lower end thereof. The first fuel injection valves 103 can be connected to the discharge port 95a by a first fuel feed pipe 105. The first fuel injection valves 103 can be connected to the second fuel injection valves 104 by a second fuel feed pipe 106. Therefore, fuel in the fuel tank 34 can be supplied to the first and the second fuel injection valves 103, 104 by the fuel pump 95.

Furthermore, the first and the second fuel feed pipes 105, 106 are formed, for example, of a hose, and can be passed through the gap Di between the front wall 91 of the fuel tank 34 and the rear portion of the air chamber 35.

Figure 7:
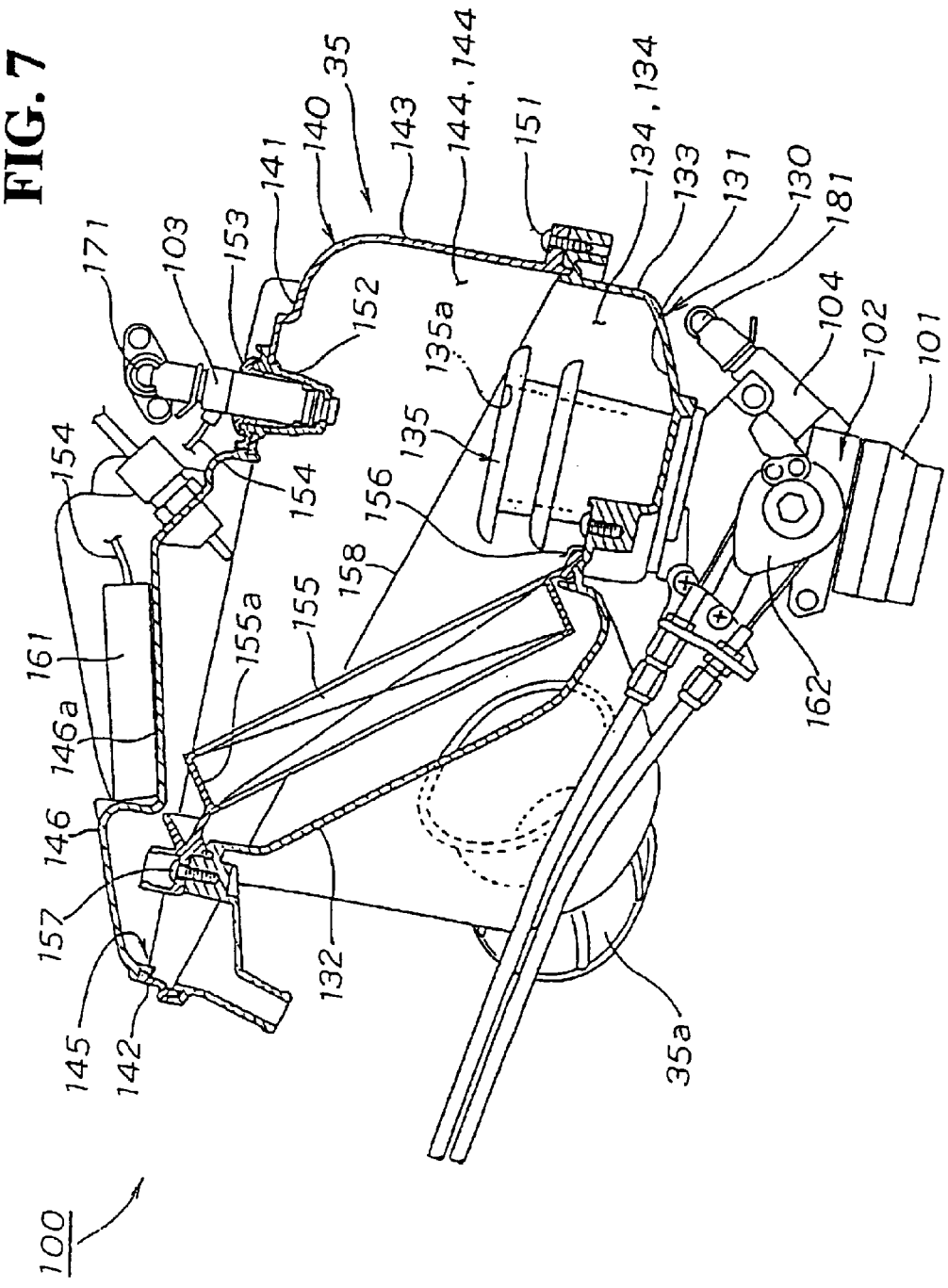
FIG. 7 is a left side cross-sectional view of a fuel injection apparatus according to the present invention.
Figure 8:
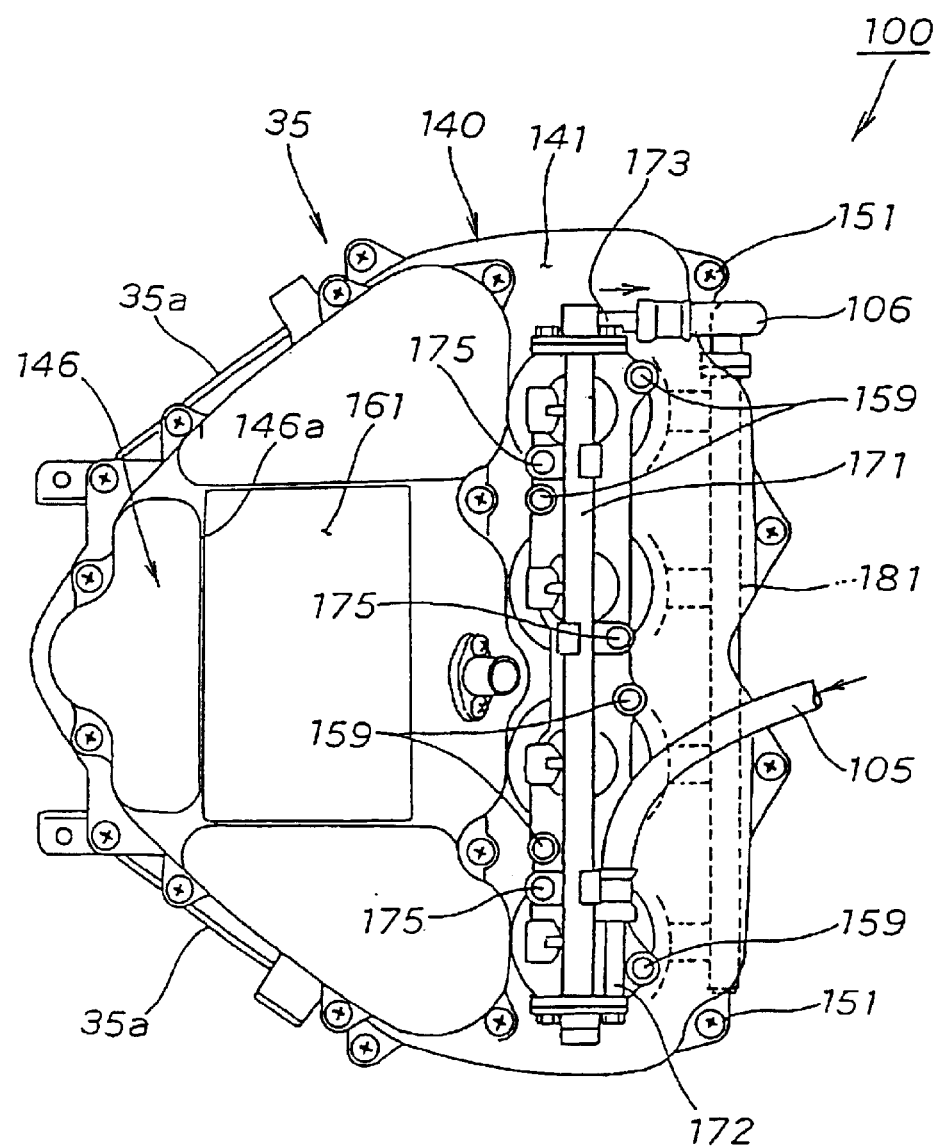
FIG. 8 is a plan view of the fuel injection apparatus according to the present invention.

FIG. 7 is a left side cross-sectional view of the fuel injection apparatus according to the present invention, illustrating a cross-sectional construction of the air chamber 35 in the fuel injection apparatus 100. FIG. 8 is a plan view of the fuel injection apparatus according to the present invention.

The air chamber 35 is a container of molded resin, which is divided into upper and lower halves, i.e., a lower chamber 130, which corresponds to the lower half, and an upper chamber 140 that corresponds to the upper half. The lower chamber 130 is secured to the upper chamber 140 by screws 151.

The lower chamber 130 is a container opened on top, including a substantially horizontal lower wall 131 (bottom plate 131) connected to the upstream end of the air intake passages 101 (only one air intake passage is shown in the drawing, hereinafter). A front wall 132 (front plate 132) extends frontward and upward from the front end of the lower wall 131. A rear wall 133 (rear plate 133) extends upward from the rear end of the lower wall 131. Left and right side walls 134, 134 (side plates 134, 134) are also included.

The lower wall 131 is provided with a plurality of airline pipes (funnels) 135 continuing to the respective upstream ends of the plurality of air intake passages 101. The extremities of the airline pipes 135 are open.

The upper chamber 140 is a container opened at the bottom, including an upper wall 141 (top plate 141) facing the lower wall 131 and the front wall 132 of the lower chamber 130. A front wall 142 (front plate 142) extends downward from the front end of the upper wall 141. A rear wall 143 (rear plate 143) extends downward from the rear end of the upper wall 141. Left and right walls 144, 144 (side plates 144, 144) are also included.

The upper wall 141 is a wall facing the lower wall 131 continuing to the upstream end of the air intake passages 101 among the walls constituting the air chamber 35. The upper wall 141 is provided with the plurality of first fuel injection valves 103 injecting fuel toward the respective upstream ends of the air intake passages 101, i.e., toward openings 135a at the extremities of the respective airline pipes 135.

More specifically, the first fuel injection valves 103 are mounted to metallic mounting members 152, and gaps formed between the mounting members 152 and the first fuel injection valves 103 are sealed with water-resistant rubber grommets (sealing members) 153, so that assembling units are provided. The mounting members 152 are then mounted to the upper wall 141 with bolts and nuts 159 (See FIG. 8). The first fuel injection valves 103 can be mounted to the upper wall 141 via the metallic mounting members 152.

The first fuel injection valves 103 are mounted to the air chamber 35 via the metallic mounting members 152. Accordingly, mounting rigidity as well as mounting accuracy can be improved.

In this manner, the provision of first fuel injection valves 103, which inject fuel toward the upstream end of the air intake passage 101, enables fuel piping (first and the second fuel feed pipes 105, 106) shown in FIG. 8 and wiring 154 shown in FIG. 7 to be connected to the first fuel injection valves 103 outside the air chamber 35.

The first fuel injection valves 103 can be attached to and detached from the air chamber 35 from the outside thereof. Accordingly, it is not necessary to disassemble the air chamber 35 for performing maintenance and inspection of the first fuel injection valves 103. Therefore, maintenance and inspection capability can be improved. In addition, the first and the second fuel feed pipes 105, 106 and wiring 154 can be connected to the first fuel injection valves 103 outside the air chamber 35. Accordingly, assembly, maintenance, and inspection can be improved.

In addition, the first and the second fuel feed pipes 105, 106 and the wiring 154 do not pass through the wall of the air chamber 35. Accordingly, it is not necessary to provide a sealing mechanism (air-tight, water-tight mechanism) at a pierced portion thereof. Therefore, the number of components of the fuel injection apparatus 100 can be reduced, and thus the construction can be simplified.

In addition, the first fuel injection valves 103 are disposed in the air chamber 35. Accordingly, the capacity of the air chamber 35 can easily be secured, and flowing resistance of air (air resistance) flowing in the air chamber 35 can be reduced.

Furthermore, even in an air chamber 35 having limited capacity, such as those to be mounted on the motorcycle 10 (See FIG. 6), the first fuel injection valves 103 can be mounted at positions away from the air intake passage 101.

The air chamber 35 also serves as an air cleaner case provided with a filter element 155. Since the air chamber 35 serves as the air cleaner case, a specific space for arranging the air cleanse case is not necessary.

More specifically, as described above in conjunction with FIG. 2 and FIG. 3, the air chamber 35 is provided with the air intake ports 35a, 35a on the left and the right sides of the front portion of the lower chamber 130.

A rectangular plate shaped filter element 155 is disposed in the air chamber 35. A frame body 155a on the edge of the filter element 155 is removably attached to the lower chamber 130. More specifically, the filter element 155 is disposed in parallel with the inclined front wall 132 of the lower chamber 130. The lower end of the frame body 155a is hooked at the hooking potion 156 (set plate 156) of the lower chamber 130. Furthermore, at least an upper end of the frame body 155a is secured to the lower chamber 130 with screws 157.

The internal space of the air chamber 35 can be partitioned by the filter element 155 into a primary side that communicates with the air intake ports 35a, 35a and a secondary side that communicates with the airline pipes 135. As a matter of course, the first fuel injection valves 103 and the airline pipes 135 are disposed on the secondary side.

In this manner, the filter element 155 is disposed in a state of inclining toward the upright posture with respect to a mating surface 158 between the lower chamber 130 and the upper chamber 140. Therefore, even when the dimension of the air chamber 35 in the fore-and-aft direction is small, the filter element 155 may be formed into a simple construction such as a flat-plate shape, the area of the filter may be maximized, and the capacity on the secondary side may be increased. That is, the ratio of the capacity of the secondary side with respect to the capacity on the primary side increases.

In addition, the air chamber 35 includes a large inspection port 145 on the upper surface thereof, i.e., on the upper wall 141 of the upper chamber 140, so as to extend to the position near the first fuel injection valves 103. A lid 146 removably closes the inspection port 145. It is possible to provide the inspection port 145 on the front side and the first fuel injection valves 103 on the rear side of the air chamber 35.

In this manner, the inspection port 145 can be provided on the wall surface on which the first fuel injection valves 103 are not provided (the portion of the upper wall 141 on which the first fuel injection valves 103 are not provided) among the walls constituting the air chamber 35.

With the above construction, removing only the lid 146 can perform maintenance and inspection of the filter element 155. Accordingly, operability can be improved.

The words "[t]he wall surface on which the first fuel injection valves 103 are not provided among the walls constituting the air chamber 35" includes all of the portions of the walls constituting the air chamber 35 on which no first fuel injection valves 103 are provided. For example, as shown in FIG. 7, the upper wall 141 is provided with the first fuel injection valves 103. However, the inspection port 145 may be formed on the portion of the upper wall 141 on which the first fuel injection valves 103 are not provided.

In addition, the lid 146 as a wall constituting the air chamber 35 is provided with an electrical component 161 for controlling the first and the second fuel injection valves 103, 104 in the vicinity of the first fuel injection valves 103.

Therefore, the upper space of the air chamber 35 can be effectively utilized.

More specifically, a flat recessed mounting portion 146a is formed on the outer surface of the lid 146, and the electrical component 161 is placed and removably attached on the mounting portion 146a by snap-fitting with a resilient claw (one-touch attachment) or by screwing.

The electric component 161 for controlling the first and the second fuel injection valves 103, 104 can easily be provided in the vicinity of the first fuel injection valves 103. Accordingly, the wiring 154 from the electric component 161 to the first and the second fuel injection valves 103, 104 can be shortened. Therefore, a reduction in weight of the motorcycle 10 as well as a reduction in cost can be achieved. Reference numeral 162 in the drawing represents a driven unit of a throttle valve control unit.

Figure 9:
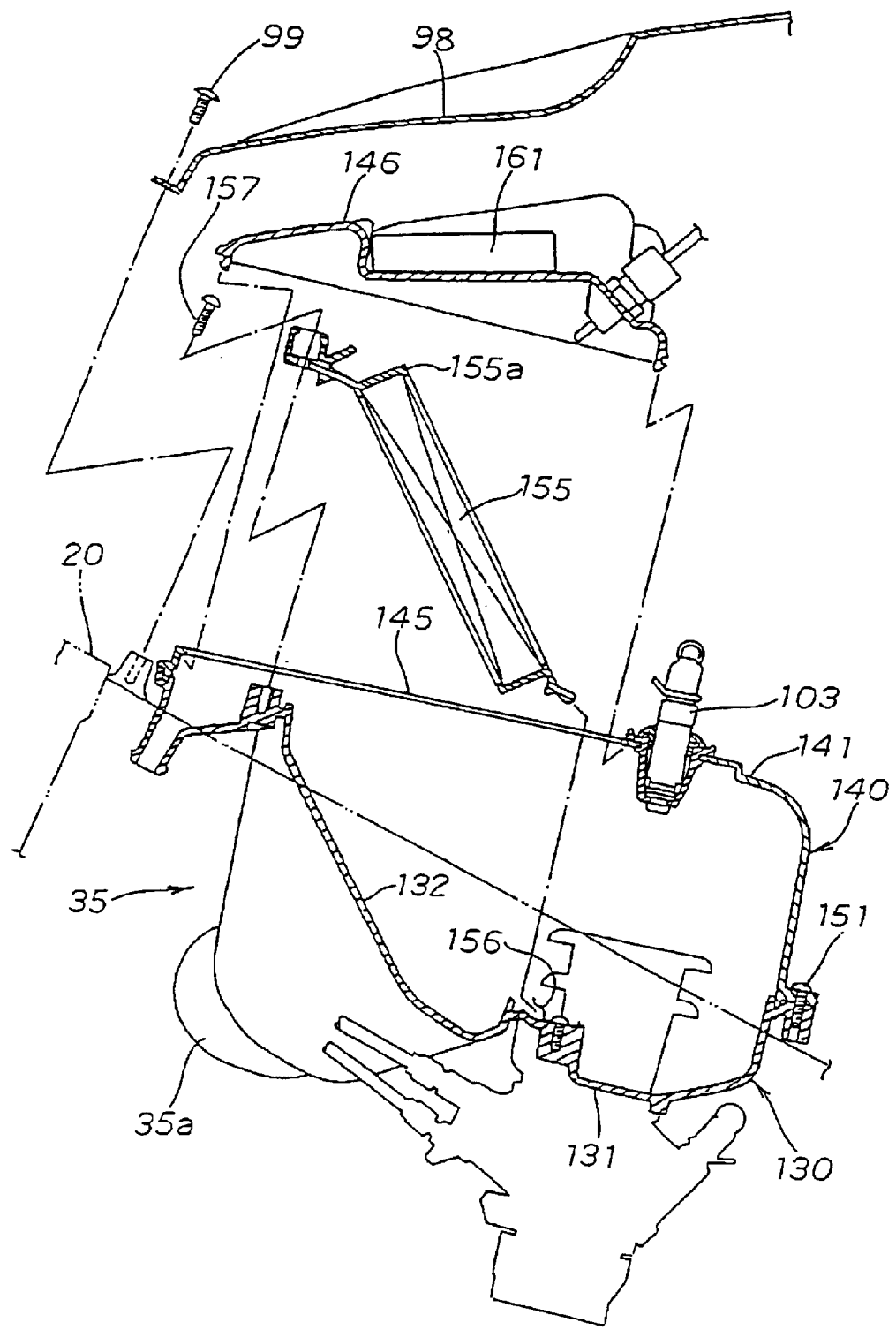
FIG. 9 is an exploded view of the air chamber according to the present invention.

FIG. 9 is an exploded view of the air chamber according to the present invention. The cover 98 can be removed upward from the vehicle body frame 20 by removing the screws 99. When the cover 98 is removed, the first fuel injection valves 103, the first and the second fuel feed pipes 105, 106, and the wiring 154 shown in FIG. 7 and FIG. 8 are exposed. Accordingly, maintenance and inspection can be performed. In particular, since maintenance and inspection of the plurality of first fuel injection valves 103 can be performed from both sides of the vehicle body, working on fuel injection valves 103 becomes quite easy.

Maintenance and inspection of the filter element 155 are performed in the following manner. First, the cover 98 is removed, and then the lid 146 is removed. The screws 157 securing the upper portion of the filter element 155 are then removed. Subsequently, by pulling out the filter element 155 forward and upward, the lower end of the filter element 155 is pulled out from the hooking portion 156.

With the above construction, simply removing the cover 98 and the lid 146 without disassembly of the air chamber 35 or removing the first fuel injection valves 103 as described above can perform maintenance and inspection of the filter element 155. Accordingly, operability can be improved. Furthermore, the lower end of the air chamber 35 is just hooked on the hooking portion 156. Accordingly, attaching and detaching of the air chamber can be improved.

The filter element 155 can be stored again simply by reversing the procedure described above.

Subsequently, referring to FIG. 6, FIG. 8, FIG. 10 and FIG. 11, the fuel piping of the fuel injection apparatus 100 (first and second fuel feeding pipes 105, 106) will be described.

Figure 10:
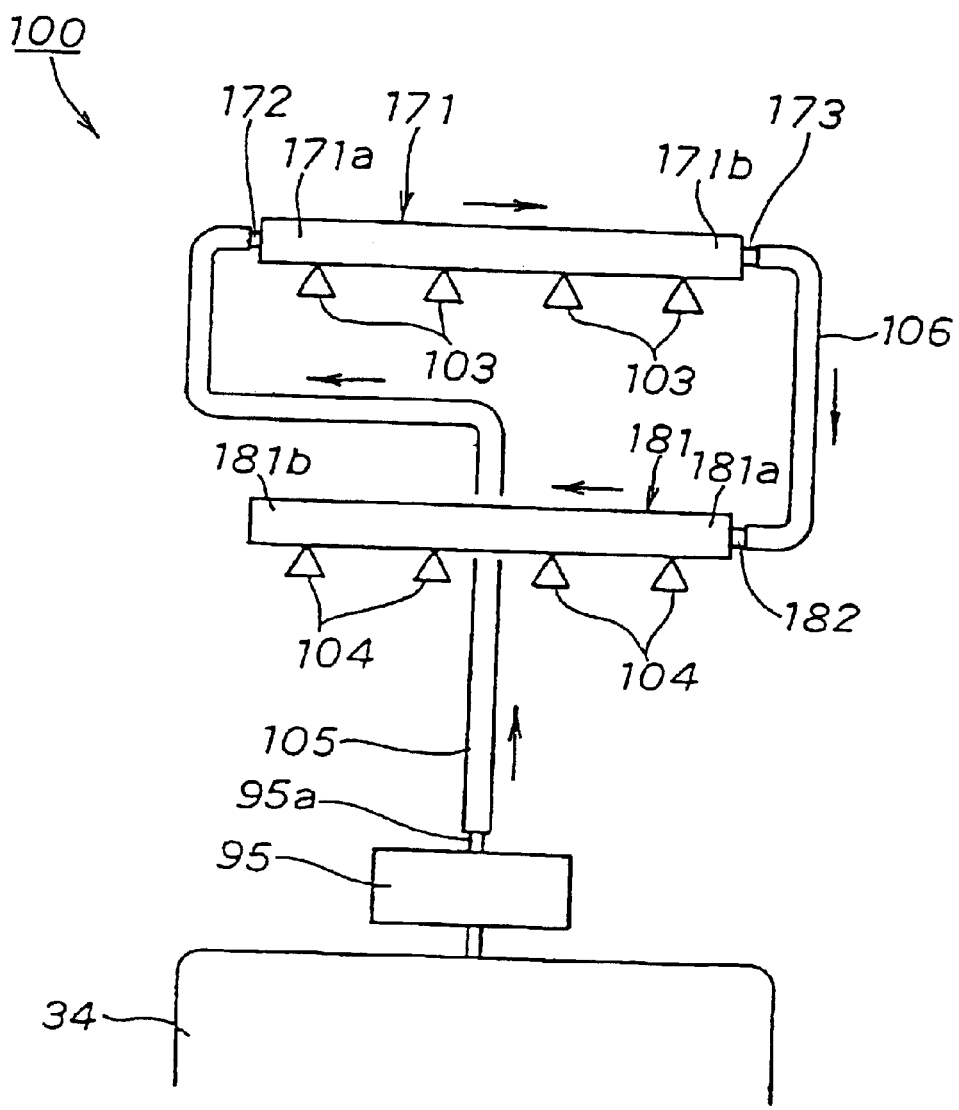
FIG. 10 is a schematic diagram of the fuel injection apparatus according to the present invention.
Figure 11:
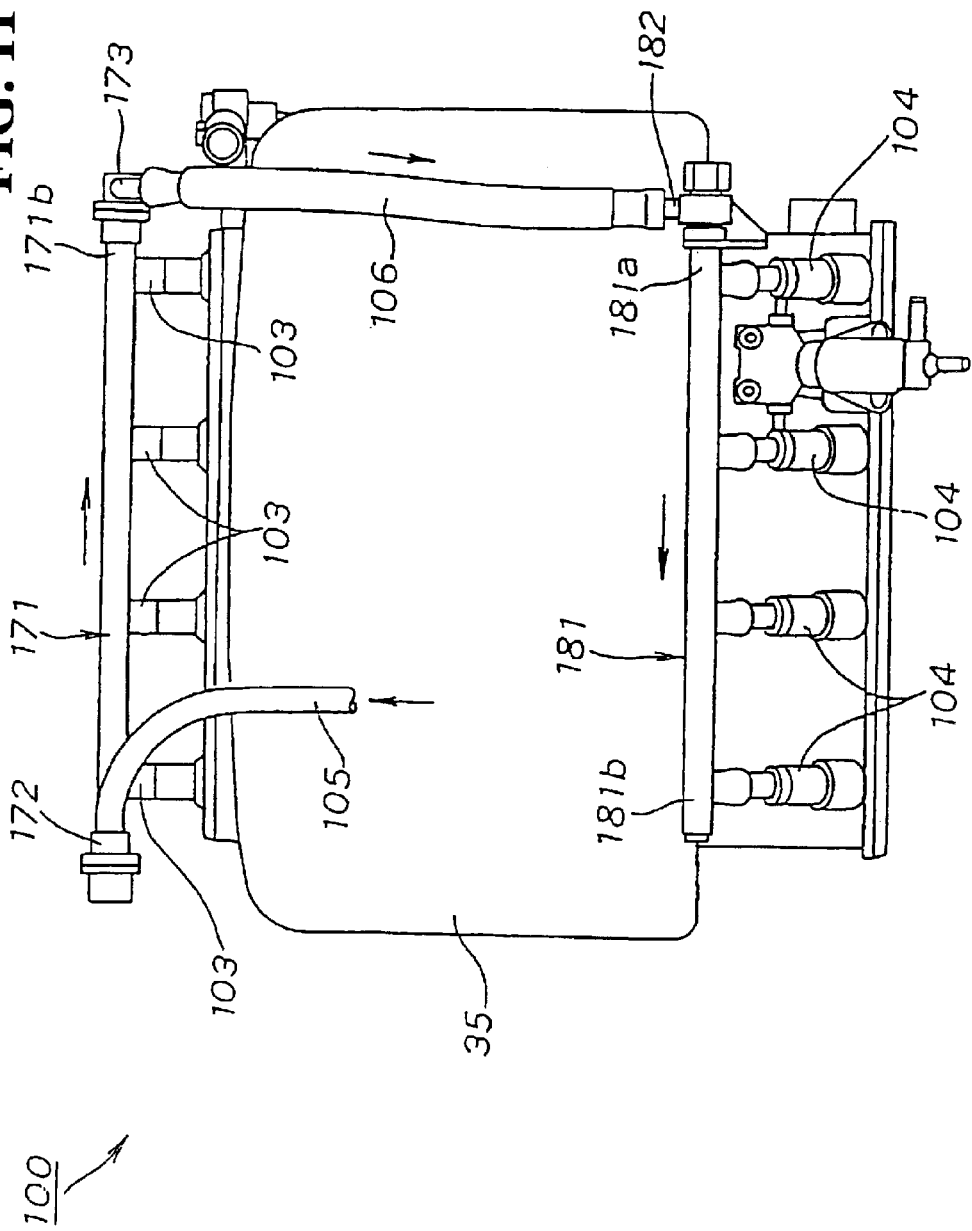
FIG. 11 is a back view of the fuel injection apparatus according to the present invention.

FIG. 10 is a schematic diagram of the fuel injection apparatus according to the present invention, illustrating a flow of fuel in the fuel injection apparatus 100 viewed from the rear side of the motorcycle 10. FIG. 11 is a back view of the fuel injection apparatus according to the present invention, illustrating the air chamber 35, the first and the second fuel injection valves 103, 104, and the first and the second fuel feed pipes 105, 106, viewed from the back side of the motorcycle 10.

FIG. 10 and FIG. 11 show that the fuel pump 95 is connected to the second fuel injection valves 104 via the first fuel injection valves 103 by the first and the second fuel feed pipes 105, 106 so that fuel does not flow back to the fuel tank 34. More specifically, a first header pipe 171 includes an outlet and an inlet of fuel (an inlet joint 172 and an outlet joint 173) on both ends. On the other hand, a second header pipe 181 includes only an inlet of fuel (inlet joint 182).

As shown in FIG. 8, the mounting members 152 with bolts and nuts 175 mount the first header pipe 171. More specifically, the plurality of first fuel injection valves 103 are connected in line with the first header pipe 171, which is formed of a straight pipe. The first header pipe 171 is provided with the inlet joint 172 at a left end (one end) 171a and the outlet joint 173 on a right end (the other end) 171b.

In the same manner, the plurality of second fuel injection valves 104 are connected in line with the second header pipe 181, which is formed of a straight pipe. The second header pipe 181 is provided with the inlet joint 182 on a right end (one end) 181a.

The second header pipe 181 is not provided with an outlet joint as in the first header pipe 171. In other words, fuel will never come out from a left end (the other end) 181b of the second header pipe 181. The first and the second header pipes 171, 181 can also be referred to as delivery pipes or fuel pipes.

The inlet joint 172 of the first header pipe 171 can be connected to the outlet port 95a of the fuel pump 95 by the first fuel feed pipe 105. The inlet joint 182 of the second header pipe 181 can be connected to the outlet joint 173 of the first header pipe 171 by the second fuel feed pipe 106. In other words, the number of joints can be reduced. Accordingly, the number of components can be reduced by connecting the first fuel feed pipe 105, the first header pipe 171 (first fuel injection valves 103), the second fuel feed pipe 106, and the second header pipe 181 (second fuel injection valves 104) sequentially in this order to the fuel pump 95.

Fuel supplied from the fuel tank 34 by the fuel pump 95 flows along a route from the first fuel feed pipe 105 through the inlet joint 172, the first header pipe 171, the outlet joint 173, the second fuel feed pipe 106, and the inlet joint 182, to the second header pipe 181. Therefore, fuel can be supplied to the first and the second fuel injection valves 103, 104 via the first and the second header pipes 171, 181.

While the engine 53 is in operation, fuel is constantly injected from the second fuel injection valves 104. Therefore, even when a small quantity of air is mixed in fuel in fuel piping, it is injected in an early stage and constantly from the second fuel injection valves 104. Consequently, the quantity of air trapped in the first header pipe 171 or in the first fuel injection valves 103 located at a higher level is negligible, and thus the engine 53 can maintain a stable performance.

A return pipe for returning fuel to the fuel tank 34 or to the fuel pump 95 from the first and the second header pipes 171, 181 is not provided. Therefore, fuel will never be returned to the fuel tank 34 or the fuel pump 95.

As shown in FIG. 6, FIG. 8, FIG. 10 and FIG. 11, the first fuel feed pipe 105 extends upward from the outlet port 95a of the fuel pump 95 located at the laterally center, passes through the gap Di between the fuel tank 34 and the air chamber 35, turns to the left in the lateral direction of the vehicle, and is connected to the inlet joint 172 at the left end 171a of the first header pipe 171.

With this construction, when the fuel tank 34 is connected to or disconnected from the vehicle body frame 20, the fuel tank 34 can be moved upward and downward in a state in which the first fuel feed pipe 105 is connected to the fuel pump 95.

On the other hand, the second fuel feed pipe 106 passes through the right side of the engine 53 (See FIG. 6) so that the outlet joint 173 at the right end 171b of the first header pipe 171 and the inlet joint 182 of the right end 181a of the second header pipe 181 are connected. Since a cam chain (a chain connecting a crankshaft and a cam shaft) is passed through the right side of the engine 53, a space around there can be effectively utilized. When the cam chain is passed through the left side of the engine 53, the piping must simply be reversed from the construction described above.

Figure 12:
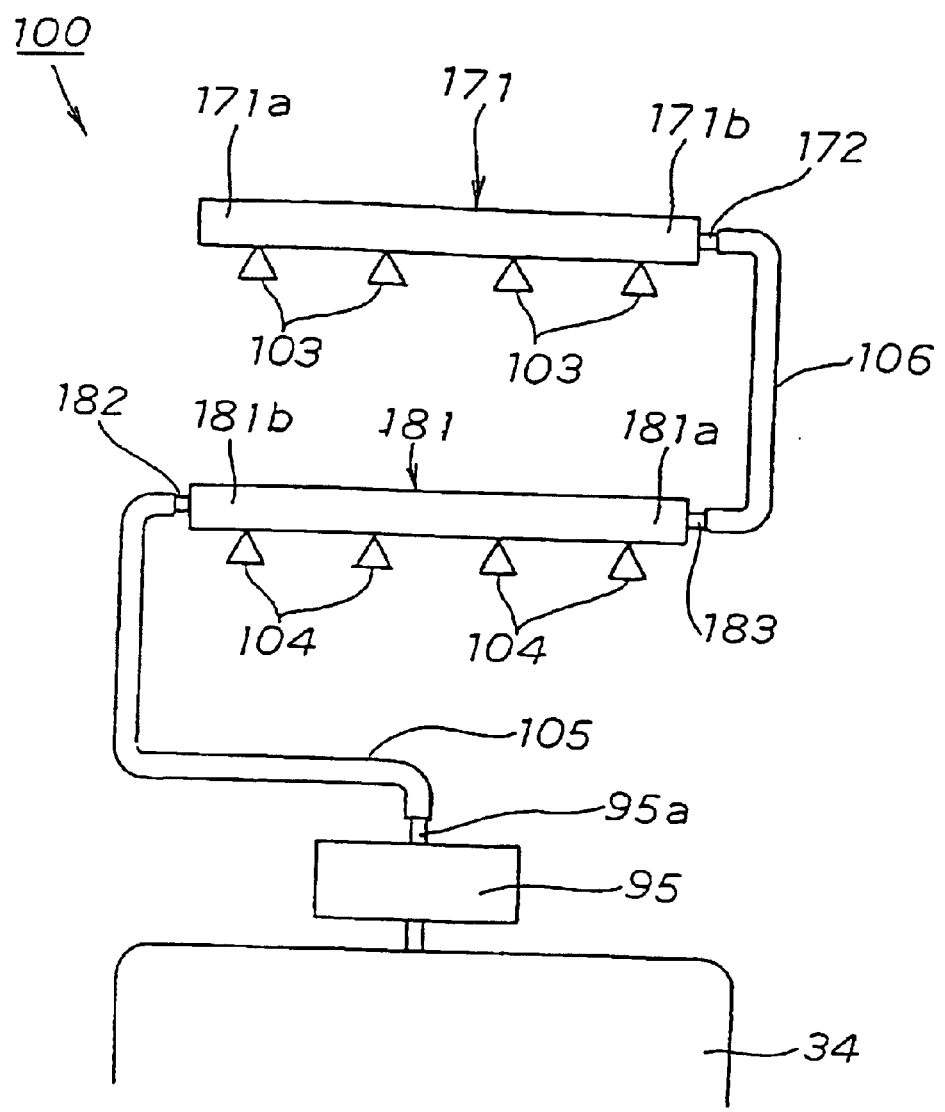
FIG. 12 is a schematic diagram of the fuel injection apparatus (modification) according to the present invention.

FIG. 12 is a schematic diagram of the fuel injection apparatus (modification) according to the present invention, illustrating a flow of fuel of the fuel injection apparatus 100 when viewed from the rear of the motorcycle 10. The same or similar elements as in the embodiment shown in FIGS. 6 to 11 are represented by the same reference numerals and will not be described again.

FIG. 12 shows that the fuel pump 95 is connected to the first fuel injection valves 103 via the second fuel injection valves 104 by the first and the second fuel feed pipes 105, 106 so that fuel does not flow back to the fuel tank 34. More specifically, the first header pipe 171 includes only the inlet for fuel (inlet joint 172). On the other hand, the second header pipe 181 includes the outlet and the inlet (inlet joint 182 and outlet joint 183) of fuel at the both ends.

In detail, the first header pipe 171 is provided with the inlet joint 172 at the right end (the other end) 181b. The first header pipe 171 is not provided with the outlet joint. Therefore, fuel will not come out from the left end (one end) 171a of the first header pipe 171.

On the other hand, the second header pipe 181 is provided with the inlet joint 182 on the left end (the other end) 181b and the outlet joint 183 at the right end (one end) 181a.

The inlet joint 182 of the second header pipe 181 can be connected to the outlet port 95a of the fuel pump 95 by the first fuel feed pipe 105. The inlet joint 172 of the first header pipe 171 can be connected to the outlet joint 183 of the second header pipe 181 by the second fuel feed pipe 106. In other words, the number of joints and hence the number of components can be reduced by connecting the first fuel feed pipe 105, the second header pipe 181 (second fuel injection valves 104), the second fuel feed pipe 106, and the first header pipe 171 (first fuel injection valves 103) sequentially in this order to the fuel pump 95.

Fuel supplied from the fuel tank 34 by the fuel pump 95 flows along the route from the first fuel feed pipe 105 through the inlet joint 108, the second header pipe 181, the outlet joint 183, the second fuel feed pipe 106, and the inlet joint 172, to the first header pipe 171. Therefore, fuel can be supplied to the first and the second fuel injection valves 103, 104 via the first and the second header pipes 171, 181.

Fuel is fed from the fuel pump 95 to the second header pipe 181, which is located at a lower level further on. While the engine 53 is in operation, fuel is constantly injected from the second fuel injection valves 104, which are located at the lower level. Therefore, even when a small quantity of air is mixed in fuel piping, it is injected in an earlier stage and constantly from the second fuel injection valves 104. Consequently, the quantity of air trapped in the first header pipe 171 or in the first fuel injection valves 103 located at a higher level is negligible, and thus the engine 53 can maintain its performance in a more stable manner.

A return pipe for returning fuel to the fuel tank 34 or to the fuel pump 95 from the first and the second header pipes 171, 181 is not provided. Therefore, fuel will never be returned to the fuel tank 34 or the fuel pump 95.

In this manner, the second fuel injection valves 104 are disposed at a level lower than the first fuel injection valves 103, and the fuel pump 95 is connected to the second fuel injection valves 104 via the first fuel injection valves 103, or to the first fuel injection valves 103 via the second fuel injection valves 104 by the first and the second fuel feed pipes 105, 106, so that fuel does not return to the fuel tank 34. Accordingly, return piping is not necessary. In view of this, the number of fuel feed pipes can be reduced correspondingly, and the number of joints (joint parts) of the fuel feed pipes can be reduced as well. Therefore, fuel piping can be simplified. In addition, since maintenance and inspection are facilitated, workability is improved.

With the arrangement described above, the present invention brings out the following advantages.

According to the first aspect of the present invention, the fuel pump is connected to the second fuel injection valve via the first fuel injection valve or to the first fuel injection valve via the second fuel injection valve by the fuel feed pipe so that fuel does not return to a fuel tank. Accordingly, return piping is not necessary and thus the number of fuel feed pipes can be reduced correspondingly. In addition, the number of joints (joint parts) of the fuel feed pipes can also be reduced. Therefore, fuel piping may be simplified. In addition, since maintenance and inspection are facilitated, the workability is improved.

According to the second aspect of the present invention, the fuel pump is connected to the second fuel injection valve via the first fuel injection valve by the fuel feed pipe. The first fuel injection valve is a fuel injection valve for high-speed operation that injects fuel when the number of revolutions of the engine is high. The second fuel injection valve is a fuel injection valve for low-speed operation that injects fuel when the number of revolutions of the engine is low.

While the engine is in operation, fuel is constantly injected from the second fuel injection valve for low-speed operation. Therefore, even when a small quantity of air is mixed in the fuel in the fuel piping, it is injected in an early stage and constantly from the second fuel injection valve. Therefore, the quantity of air trapped in the first fuel injection valve for high-speed operation is negligible, and thus the engine can maintain a stable performance.

According to the third aspect of the present invention, the fuel pump is connected to the first fuel injection valve via the second fuel injection valve by the fuel feed pipe and the first fuel injection valve is disposed at the level higher than the second fuel injection valve.

Fuel is supplied from the fuel pump to the second fuel injection valve, which is located at a lower level on ahead. When the engine is in operation, fuel is injected constantly from the second fuel injection valve, which is located at the lower level. Therefore, even when a small quantity of air is mixed in the fuel in the fuel piping, it is injected in an early stage and constantly from the second fuel injection valve. Consequently, the quantity of air trapped in the first fuel injection valve located at a higher level is negligible, and thus the engine can maintain its performance in more stable manner.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine fuel injection apparatus, comprising:
    a first fuel injection valve provided on an upstream side of an air intake passage of an engine;
    a second fuel injection valve provided on a downstream side of the air intake passage; and
    a fuel pump for supplying fuel to the first and the second fuel injection valves, wherein said fuel pump is connected to the second fuel injection valve via the first fuel injection valve or to the first fuel injection valve via the second fuel injection valve by a fuel feed pipe, so that fuel does not return to a fuel tank of the engine.

2. The engine fuel injection apparatus according to claim 1, wherein the fuel pump is connected to the second fuel injection valve via the first fuel injection valve by the fuel feed pipe, the first fuel injection valve is a fuel injection valve for high-speed operation that injects fuel when a number of revolutions of the engine is high, and the second fuel injection valve is a fuel injection valve for low-speed operation that injects fuel when the number of revolutions of the engine is low.

3. The engine fuel injection apparatus according to claim 1, wherein the fuel pump is connected to the first fuel injection valve via the second fuel injection valve by the fuel feed pipe and the first fuel injection valve is disposed at a level higher than the second fuel injection valve.

4. The engine fuel injection apparatus according to claim 1, wherein said fuel feed pipe passes through a space between a front wall of the fuel tank and a rear wall of an air chamber of the engine.

5. The engine fuel injection apparatus according to claim 2, wherein said fuel feed pipe passes through a space between a front wall of a fuel tank of the engine and a rear wall of an air chamber of the engine.

6. The engine fuel injection apparatus according to claim 1, wherein there are a plurality of each of said first and second fuel injection valves, said first fuel injection valves are connected to each other through a first header pipe, and said second fuel injection valves are connected to each other through a second header pipe.

7. The engine fuel injection apparatus according to claim 2, wherein there are a plurality of each of said first and second fuel injection valves, said first fuel injection valves are connected to each other through a first header pipe, and said second fuel injection valves being connected to each other through a second header pipe.

8. The engine fuel injection apparatus according to claim 3, wherein there are a plurality of each of said first and second fuel injection valves, said first fuel injection valves are connected to each other through a first header pipe, and said second fuel injection valves being connected to each other through a second header pipe.

9. The engine fuel injection apparatus according to claim 1, wherein said fuel feed pipe includes first and second fuel pipes, said first fuel pipe extends from said fuel pump to said first fuel injection valve, and said second fuel pipe extends from said first fuel injection valve to said second fuel injection valve.

10. The engine fuel injection apparatus according to claim 1, wherein said fuel feed pipe includes first and second fuel pipes, said first fuel pipe extends from said fuel pump to said second fuel injection valve, and said second fuel pipe extends from said second fuel injection valve to said first fuel injection valve.

11. A fuel injection apparatus for an engine, comprising:
a first fuel injection valve provided on an upstream side of an air intake passage of an engine;
a second fuel injection valve provided on a downstream side of the air intake passage;
a fuel tank; and
a fuel pump, said fuel pump including an inlet in communication with said fuel tank and an outlet connected to a fuel feed pipe to supply fuel to the first and the second fuel injection valves, said fuel feed pipe including a first fuel pipe connected between said fuel pump and one of said first and second fuel injection valves and a second fuel pipe connected between said first and second fuel injection valves.

12. The fuel injection apparatus according to claim 11, wherein said first fuel pipe connects the fuel pump to the first fuel injection valve, the first fuel injection valve is a fuel injection valve for high-speed operation that injects fuel when a number of revolutions of the engine is high, and the second fuel injection valve is a fuel injection valve for low-speed operation that injects fuel when the number of revolutions of the engine is low.

13. The fuel injection apparatus according to claim 11, wherein said first fuel pipe connects the fuel pump to the second fuel injection valve and the first fuel injection valve is disposed at a level higher than the second fuel injection valve.

14. The fuel injection apparatus according to claim 11, wherein said first and second fuel pipes pass through a space between a front wall of the fuel tank and a rear wall of an air chamber of the engine.

15. The fuel injection apparatus according to claim 12, wherein said first and second fuel pipes pass through a space between a front wall of the fuel tank and a rear wall of an air chamber of the engine.

16. The fuel injection apparatus according to claim 11, wherein there are a plurality of each of said first and second fuel injection valves, said first fuel injection valves are connected to each other through a first header pipe, and said second fuel injection valves are connected to each other through a second header pipe.

17. The fuel injection apparatus according to claim 12, wherein there are a plurality of each of said first and second fuel injection valves, said first fuel injection valves are connected to each other through a first header pipe, and said second fuel injection valves being connected to each other through a second header pipe.

18. The fuel injection apparatus according to claim 13, wherein there are a plurality of each of said first and second fuel injection valves, said first fuel injection valves are connected to each other through a first header pipe, and said second fuel injection valves being connected to each other through a second header pipe.

* * * * *